US007680112B2

(12) United States Patent
Demsey et al.

(10) Patent No.: US 7,680,112 B2
(45) Date of Patent: Mar. 16, 2010

(54) PEER-TO-PEER COMMUNICATION SYSTEM

(75) Inventors: Seth M. Demsey, Seattle, WA (US); William Michael Zintel, Kenmore, WA (US); Bruce E. Johnson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 846 days.

(21) Appl. No.: 11/213,520

(22) Filed: Aug. 26, 2005

(65) Prior Publication Data

US 2007/0061476 A1    Mar. 15, 2007

(51) Int. Cl.
  *H04L 12/28* (2006.01)
(52) U.S. Cl. .................. 370/392; 370/400; 709/206
(58) Field of Classification Search ................ 370/351, 370/346; 709/203–208, 212, 217, 218, 219
  See application file for complete search history.

(56) References Cited

U.S. PATENT DOCUMENTS

| | | | | |
|---|---|---|---|---|
| 7,269,624 | B1 * | 9/2007 | Malik | 709/206 |
| 2002/0122543 | A1 * | 9/2002 | Rowen | 379/93.01 |
| 2003/0050959 | A1 * | 3/2003 | Faybishenko et al. | 709/202 |
| 2004/0137955 | A1 * | 7/2004 | Engstrom et al. | 455/566 |
| 2004/0186918 | A1 * | 9/2004 | Lonnfors et al. | 709/250 |
| 2005/0164693 | A1 * | 7/2005 | Yach et al. | 455/419 |
| 2005/0164721 | A1 * | 7/2005 | Eric Yeh et al. | 455/466 |
| 2006/0009243 | A1 * | 1/2006 | Dahan et al. | 455/466 |
| 2006/0031309 | A1 * | 2/2006 | Luoffo et al. | 709/206 |
| 2008/0215867 | A1 * | 9/2008 | Mackin et al. | 713/1 |

OTHER PUBLICATIONS

International Search Report from corresponding International Application No. PCT/US06/2953, filed Jul. 27, 2006.

* cited by examiner

*Primary Examiner*—Jayanti K Patel
*Assistant Examiner*—Jung Park
(74) *Attorney, Agent, or Firm*—Wolf, Greenfield & Sacks, P.C.

(57) ABSTRACT

A peer-to-peer communication system that transmits application data from an application component on one network peer to an application component on another network peer. A programming interface is provided to the communication system to facilitate programming of applications that rely on peer-to-peer communications. The communication system uses messaging providers to which each peer may be connected for purposes other than communications between peer-to-peer application components, thereby reducing the resources a peer-to-peer application requires for communication and making the system advantageous for use in portable electronic devices. Additionally, the communication system uses addresses already assigned in each messaging provider, allowing peer-to-peer communication between peers that may otherwise have been non-addressable.

20 Claims, 4 Drawing Sheets

PEER-TO-PEER COMMUNICATION SYSTEM

BACKGROUND OF INVENTION

Computer networks are widely used for communication of data and are used to provide many business and personal applications that rely on an exchange of data between computing devices in different locations. The Internet is an example of a widely used communication network. Such networks includes multiple interconnected servers and other devices, to which data may be sent or from which data may be obtained by other devices connected to the network. To enable network communications to be directed to specific devices within the network, each device may be assigned a network address. Each address is typically unique and persistent, meaning that any message sent over the network containing the address for a specific device will always be routed to that device.

Many users of applications that rely on network communication connect to the network as "peers." In this context, "peer" refers to a platform that may contain hardware and software through which access to the network is obtained, often by a single user. As a result, there can be many more peers in a network than there are other devices, such as servers. Because networks usually have a limited number of addresses available, there are often not enough network addresses for every peer to have a unique network address.

Rather than being assigned a unique and persistent address, each peer conventionally connects to the network through a device, such as a router, that performs network address translation (NAT). The router may have a unique and persistent network address such that messages sent over the network may be addressed to the router. The router, in turn, is connected to multiple peers over a sub-network. Each peer may be assigned an address that is meaningful only within the sub-network.

As the peer sends messages intended for communication over the network, it may insert its sub-network address as the address from which the message was sent. The router receives these messages over the sub-network and forwards them on to the network. Before forwarding the message, the router translates the peer's sub-network address to its own address that is recognized as a valid network address.

Servers and other network devices that process messages may use the address in the message to direct a response to the sender of the original message. Accordingly, the router receives all responses intended for any of the peers connected through its sub-network. The router then forwards these messages over its sub-network, but first translates the address in each incoming message to the sub-network address of the peer intended to receive the message. In this way, each peer can send messages over the network and receive responses.

But, because the address of a peer may not be unique and persistent, it is difficult for a network device to initiate communication with a peer. To initiate communication with a peer, another peer or network device would need to discover an address that can be used to send messages to that peer.

One way that the need for address discovery is avoided is through the use of a store-and-forward messaging system. A store-and-forward messaging system employs a relay server having a unique and persistent address within the network. Messages intended for a peer may be sent to the relay server, which stores the messages. The relay server waits for the peer for which the message is intended to send a message to the relay server requesting any stored messages intended for the peer. Such a message will include an address the relay server may use to direct a response to the peer and the relay server can transmit any stored messages intended for the peer as a response to that message.

For a store-and-forward system to work, the relay server must have a way to identify specific peers for which messages are intended. To identify peers, the relay server may establish its own addressing mechanism. Because such addresses are not used as network addresses, the relay server is unconstrained by any limitations on the available number of network addresses in assigning addresses.

E-mail is an example of a store-and-forward messaging system in widespread use. Every user of an e-mail service has an e-mail address, which can be used by both the relay server and other peers to route messages to a peer from which a user accesses the e-mail system.

Other network addressing mechanisms are known. Some messaging providers use networks for which a network address is assigned to every peer. For example, the cellular phone system assigns a unique and persistent address (i.e., the phone number) to every peer, allowing text messages in SMS format to be sent from one peer to another without the intervention of a relay server.

As another example, instant messaging uses a different approach to provide realtime transmission of messages to peers. In an instant messaging format, peers that are available to receive messages identify themselves to a relay server operated by a messaging provider. Once the relay server obtains an address through which messages may be sent to a peer, that address may be provided to other peers wanting to communicate with that peer.

SUMMARY OF INVENTION

The invention relates to peer-to-peer communication. In one aspect, a programming interface is provided to a communication component on each peer that may receive or transmit data. The interface facilitates creation of application programs requiring peer-to-peer communications.

The communication component may transmit and receive messages using a messaging provider that would be accessed on the peer for reasons other than communications of data between peer-to-peer applications, allowing peer-to-peer applications to be implemented without consuming substantial resources for communication, which can be significant for resource constrained devices such a smart phones, PDAs and pocket PCs. Using an existing messaging provider to transmit peer-to-peer application data also simplifies communications by enabling use of addressing mechanisms that are already established.

In another aspect, the communication component may aggregate messages received from multiple messaging providers or select a messaging provider from multiple available messaging provider to send a message. This structure allows messaging providers offering services with different characteristics to be available to meet the needs of various applications, or to meet various needs of the same application at different times, such as by allowing messaging providers offering different transmission characteristics to be used to convey different types of messages for the same application.

The foregoing summary is not limiting of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

We have recognized that significant advantages can be obtained in providing applications that rely on peer-to-peer communication. By providing a simple way for such applications to exchange data, applications can be more readily developed for a peer-to-peer environment.

As described in more detail below, a programming interface is provided to allow application programs to send and receive data using existing messaging providers. The interface allows applications running on each peer to exchange data with other peers in much the same way that an application may store and retrieve information from a data store. An application developer is thereby freed of the need to understand network addressing or the complexities associated with network communications. As a further advantage, using existing messaging providers can greatly reduce the size of applications based on peer-to-peer communications. Such a size reduction can be particularly significant in resource constrained systems. Therefore, providing an application programming interface through which messaging providers may be readily accessed facilitates the deployment of peer-to-peer applications for portable electronic devices.

Further, the programming interface may facilitate communication with devices that have addresses that are normally masked by their messaging providers. For example, current addressing techniques used by cellular messaging providers do not provide a convenient mechanism for communication from applications to specific addressees.

Figure 1:
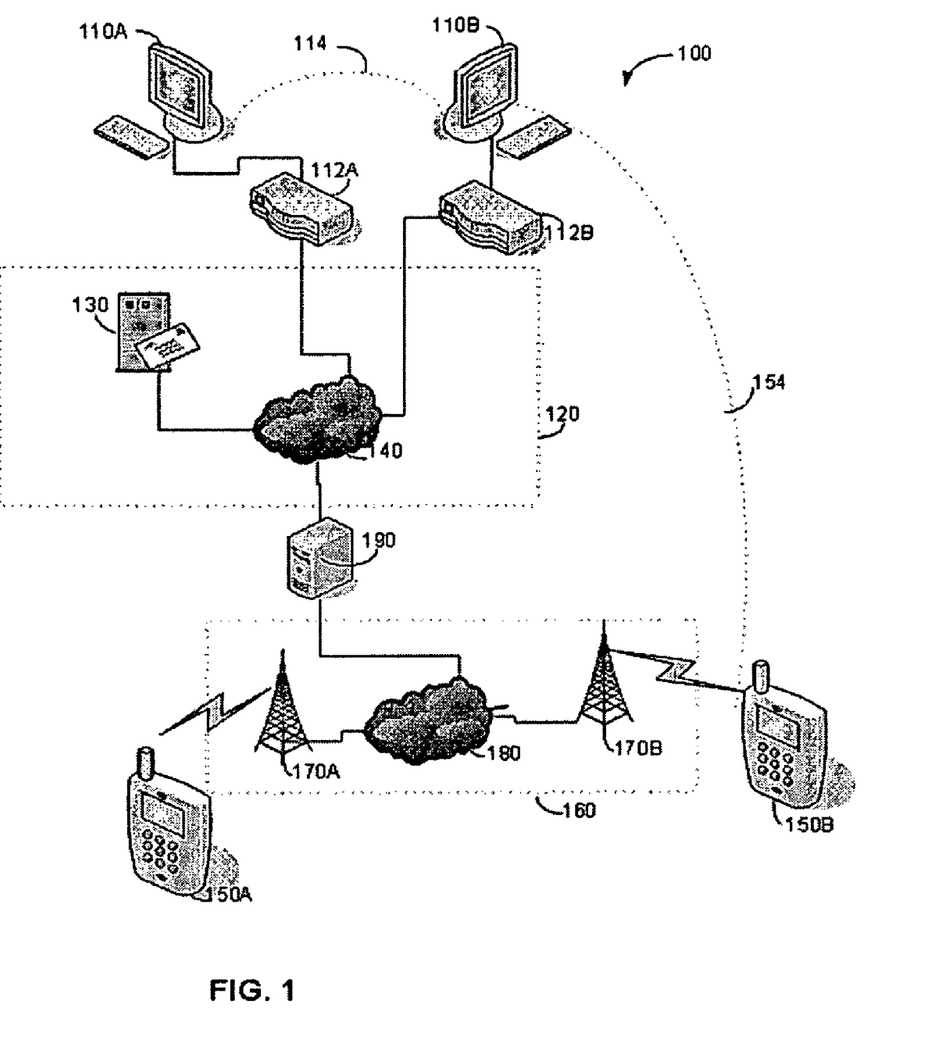
FIG. 1 is sketch of a peer-to-peer network.

An embodiment of the invention may be employed in peer-to-peer network 100 shown in FIG. 1. Peer-to-peer network 100 has multiple peers, such as peers 110A and 110B. Each peer may be a desktop computer or any other network enabled computing device. Peers such as 110A and 110B may communicate through messaging provider 120. In this example, messaging provider 120 provides a store-and-forward type e-mail system.

Messaging provider 120, in this example, uses the Internet 140 to transport e-mail messages. Each of the peers 110A and 110B may be connected to Internet 140 through a device that performs network address translation and may therefore have no fixed Internet address. In this example, peers 110A and 110B are connected through routers 112A and 112B that perform network address translation.

Messaging provider 120 includes relay server 130. In this example, relay server 130 is a mail server. Relay server 130 may have a fixed Internet address such that any peer may initiate communication with it.

Each of the peers 110A and 110B may include computer-readable medium on which data and computer-executable instructions are stored. Some portion of the computer-executable instructions on each of peers 110A and 110B may implement a messaging client 230 (FIG. 2) that may be used to send or receive e-mail messages using messaging provider 120. For example, a messaging client 230 on peer 110A may receive user input specifying an e-mail message to be sent and an e-mail address to which the message is to be sent. The messaging client may then transmit a message through router 112A to relay server 130. If the e-mail message is intended for a user accessing the network through peer 110B, a messaging client 230 (FIG. 2) on peer 110B may access relay server 130 through router 112B to receive e-mail messages from server 130. In this way, e-mail messages may be transmitted from peer 110A to peer 110B. The converse steps may be taken to send messages from peer 110B to peer 110A.

To facilitate sharing of application data between components of an application running on peer 110A and components of the application running on peer 110B, communication client 230 on peer 110A may send messages to relay server 130 containing application data. Similarly, communication client 230 on peer 110B may retrieve messages containing application data from relay server 130. Communication client 230 may then make that data available to a recipient application component on peer 110B. In this way, a virtual link 114 may be established between a peer application component on peer 110A and a peer application component on peer 110B. Similar virtual links may be established between any two or more peers having access to messaging provider 120.

Peer-to-peer network 100 may also include other messaging providers that may be used to transport application data. In the example of FIG. 1, messaging provider 160 is shown. In this embodiment, messaging provider 160 transports messages using a cellular telephone system. Messaging provider 160 operates multiple access points, such as access points 170A and 170B. The access points are interconnected by a messaging backbone 180. In this example, messaging provider 160 is a network managed by a cellular telephone company and may transport multiple types of messages, including text messages. Users of the messaging provider 160 access the network through peers that may be cellular telephones, smart phones, or other devices equipped to send and receive messages. In this example, peers 150A and 150B are illustrated as portable handheld electronic devices that are constructed to receive messages in an SMS format.

Messaging providers 120 and 160 are examples of messaging providers that may be used to communicate data between application components running on different network peers. Any suitable message provider may be used. A simple approach to peer-to-peer communication that uses relatively few resources on a peer as described herein may be particularly desirable for peers that are based on portable computing devices. Such devices are typically connected to messaging providers that operate according to protocols such as IMAP, POP3, SMTP, SMS, HTTP, TCP/IP and MMS.

The messaging providers may be accessed indirectly through a web service or other suitable means. In network 100, access to messaging provider 160 by devices connected to internet 140 through a web service provided by server 190. Server 190 is connected to backbone 180 of messaging provider 160. Server 190 may send messages addressed to any of the peers, such as 150A and 150B, connected to backbone 180 by messaging provider 160. Additionally, server 190 has a network address recognized by messaging provider 160 and may receive messages from peers 150A or 150B connected through messaging provider 160.

Server 190 is also coupled to peers, such as peers 110A and 110B, through a connection to Internet 140 and may exchange messages with any peer connected to Internet 140. Such peers can use a web service provided by server 190 to send and receive messages using messaging provider 160.

Server 190 interconnects messaging providers 120 and 160 and may forward messages sent using one messaging provider to a peer that receives messages over the other messaging provider. This cross-coupling between Internet 140 and backbone 180 allows data to be sent from a peer connected to Internet 140 to a peer connected to messaging provider 160. Virtual link 154 illustrates that communication between peer 110B and peer 150B is possible. A similar virtual link may be used to transmit application data between peers connected to different messaging providers.

Figure 2:
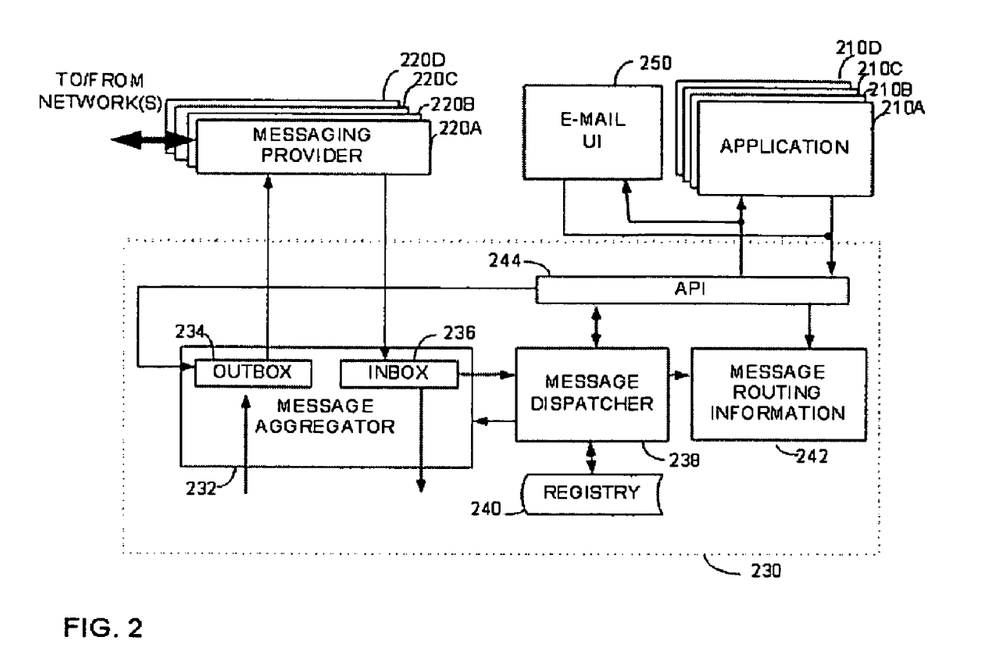
FIG. 2 is a diagram illustrating an architecture of software used in the peer-to-peer network of FIG. 1.

Turning to FIG. 2, a software architecture of a messaging client 230 is illustrated. Such a messaging client may be used on any peer for which communication is desired. Messaging client 230 may be used on a peer on which applications, such as applications 210A . . . 210D, execute. Such a peer may also be programmed with an e-mail user interface 250 to provide e-mail communications.

Messaging client 230 facilitates communication using multiple messaging providers, such as messaging providers 220A, 220B, 220C and 220D. Such messaging providers may, for example, be an Internet Service Provider that provides access to an e-mail messaging system, a cellular telephone company that provides access to an SMS messaging system or any other messaging provider whether now known or hereafter developed. Such messaging providers need not be commercial entities and any mechanism by which a network peer may send messages may be regarded as a "messaging provider." Nor does a messaging provider have to be established by a single entity. A "messaging provider" could be a collection of components, owned or operated by different entities, that interact to transmit messages.

In the embodiment illustrated, messaging client 230 is implemented as a plurality of computer-executable instructions stored on a computer-readable medium associated with a peer. In embodiments in which a peer is implemented as software executing on a desktop computer or other computing device, the computer-readable medium may be computer memory in the computing device. The computer-executable instructions may be prepared in any desired programming language and may be converted to machine code or executable code before storage in the computer-readable medium or may be interpreted or applied to a JIT compiler to derive executable code at run time.

In FIG. 2, the computer executable instructions making up messaging client 230 may be organized as a plurality of modules, each of which performs a function associated with the messaging client. Each module may interact with other modules according to constructs of the programming language used to create the modules. For example, each module may contain function calls that are exposed to other modules so that the functions of one module may be called from another module. Alternatively, the modules may be linked into one executable file with references from one module to another resolved as part of the linking. As a further alternative, each module may be an element of a library of modules that are dynamically linked when executed. Accordingly, the specific form in which each of the modules is implemented and in which the modules interact is not critical to the invention and any suitable method may be used.

One of the modules illustrated in FIG. 2 is messaging aggregator 232. Messaging aggregator 232 acts as an interface to multiple messaging providers 220A . . . 220D. It includes an inbox 236 and an outbox 234. Messaging aggregator 232 may be constructed to interact with each messaging provider using known techniques. However, messaging aggregator 232 provides a mechanism to interact with multiple messaging providers. In the illustrated embodiment, messaging aggregator 232 includes inbox 236 through which messages may be received from any of the messaging providers and outbox 236 through which messages may be sent using any of the messaging providers.

Inbox 236 may receive messages from all of the messaging providers 220A . . . 220D and buffer them in memory until processed by e-mail user interface 250 or an application such as 210A . . . 210D. The messages may be stored with an indication of the source of the message, which may include an indication of the messaging provider through which the message was received. Such an indication may be expressly stored or may be implied from other information that is stored. For example, messages may include an indication of an address from which a message originated, which may indicate the messaging provider that transmitted the message.

Outbox 234 may receive messages from e-mail user interface 250 or an application 210A, . . . 210D and buffer them in memory until they are transmitted. Outbox 234 may buffer messages to be transmitted over any of the messaging providers. Each message to be transmitted may be stored with message routing information, such as an indication of the messaging provider over which it is to be transmitted. Such an indication may be expressly included in the message or may be included by implication, such as by indicating the destination address of the message in a format that identifies the messaging provider through which such a message may be sent.

To facilitate supply of message routing information, messaging client 230 includes message routing information module 242. Message routing information module 242 may contain a directory of addressees in association with routing information for each addressee. The routing information may include one or more addresses useful for transmitting messages to the addressee. The routing information may explicitly specify a messaging provider that can carry messages to that addressee. Routing information may alternatively or additionally be provided implicitly based on the form of the address stored. In some embodiments, message routing information module 242 may contain routing information for more than one mode of transmission to a single addressee, allowing messaging client 230 to select the most appropriate messaging provider for the form of the message to be delivered or to use an alternative messaging provider if the message can not be delivered via the first selected messaging provider. Outbox 234 may use the routing information to format the message for transmission using one of the messaging providers 220A . . . 220D.

FIG. 2 shows additional modules of messaging client 230 that facilitate peer-to-peer messages between computer applications. In the illustrated embodiment, messaging client 230 includes message dispatcher 238, registry 240 and application programming interface (API) 244 that facilitates communication between messaging client 230 and e-mail user interface 250 or applications 210A, 210B, 210C and 210D.

In this example, applications 210A, 210B, 210C and 210D represent any applications that may execute on a peer. The applications may be data processing applications such as a word processor or spread sheet. In this example, the data processing applications may be operated in a peer-to-peer mode in which data is obtained from or sent to another peer. The data may be sent to or received from a corresponding data processing application or any other application that generates or uses data.

However, the invention is not limited to use in connection with data processing applications and applications 2110A, 2110B, 210C and 210D may be any applications, whether now known or hereafter developed, that may be operated in a peer-to-peer mode. For example, some or all of the applications 210A, 210B, 210C and 210D may be games or other peer-to-peer applications for entertainment use. In an embodiment in which the applications are games, peers within peer-to-peer network 100 may each be equipped with a component of a gaming application. Data sent between peers may represent "moves" in a game or other gaming information.

E-mail user interface 250 includes software that presents a user interface to a human user of the peer on which messaging client 230 is installed. The precise form of the interface may depend on the hardware components of the computer processor of the peer, but may include interfaces such as graphical user interfaces presented on a display activated through a mouse or other pointing device, a text interface accessed through a keyboard or a natural language interface accessed through an audio interface. E-mail user interface 250 also receives text or other input from a human user that specifies the content of an e-mail message to be sent and routing information for that message.

E-mail user interface 250 and each of the applications 210A, 210B, 210C and 210D may be implemented as one or more components containing computer-executable instructions. The computer executable instructions may be in any suitable computer language. Such applications are known in the art and e-mail user interface 250 and applications 210A, 210B, 210C and 210D may be constructed using known programming techniques.

E-mail user interface 250 and applications 210A, 210B, 210C and 210D differ from conventional e-mail client software and applications as known in the art in that they send and receive messages using API 244. API 244 provides a mechanism for applications 210A, 210B, 210C and 210D to send data to or receive data from an application component on another peer and for e-mail user interface 250 to send and receive e-mail messages with e-mail clients on other peers. API 244 simplifies programming of applications and creating an e-mail client because it avoids the need for such programs to include software that performs any of the data communication functions that are performed by messaging client 230.

In some embodiments, API 244 provides an interface to applications 210A, 210B, 210C and 210D that is in the same form as an interface to a data store. Because data stores are commonly used in application programs, API 244 provides a mechanism for a computer programmer to incorporate peer-to-peer communications in an application using simple commands of a familiar form. API 244 also provides functions for e-mail user interface 250, such as sending and receiving messages, that are conventionally found in an e-mail client, allowing e-mail user interface 250 to be simpler than traditional e-mail client software even though messages may be sent using multiple messaging providers.

API 244 may be a module containing computer-executable instructions in any suitable computer language. In this embodiment, API 244 may be dynamically linked to e-mail user interface 250 and applications 210A, 210B, 210C and 210D so that functions implemented in API 244 may be called from within e-mail user interface 250 and applications 210A, 210B, 210C and 210D. Linking also allows functions within applications 210A, 210B, 210C and 210D and e-mail user interface 250 to be called from within API 244.

In this embodiment, API 244 includes multiple communication functions that may be called from applications 210A, 210B, 210C and 210D and e-mail user interface 250. One such function (a "SEND" function) may transmit data using a messaging provider to which the peer has access. To transmit data, API 244 provides the data to outbox 234.

The SEND function may operate synchronously or asynchronously. For synchronous operation, the function may return when the message is sent by the selected messaging provider, thereby blocking execution of the calling program until the transmission is completed. For asynchronous operation, the SEND function may operation so as not to block execution of the calling program.

Outbox 234 may provide the message to the desired messaging provider in the appropriate form. For example, outbox 234 may format the message with a header specifying the intended addressee, a sender address, a time stamp or other desired information and append the data in the message body.

The SEND function provided by API 244 may accept as one of its parameters an indication of the recipient of the information. The recipient may be identified in any suitable way. In one embodiment, the recipient is identified as a named addressee and need not be specified by an address for a peer connected via one of the messaging providers. Outbox 234 may determine the appropriate address in a format recognized by one of the messaging providers 220A . . . 220D from a record in message routing information module 242. In this way, application information may be sent from an application component on one peer to an application component on another peer without the need for the application components to be programmed to use peer addresses.

To facilitate delivery of messages to the intended application component once the message reaches the peer on which that application component executes, messaging client 230 may be constructed such that data for communication between peer applications is tagged with an identifier before transmission. For example, the SEND function within API 244 may, before passing data to outbox 234, attach an application tag identifying the data as representing data for peer-to-peer communications. Such an application tag may also identify the application from which the data originated and/or the application for with the data is intended. Alternatively, the data may be tagged with an application tag to identify the data as representing an e-mail message to be processed by an e-mail user interface 250.

Upon receipt of a message over one of messaging providers 220A, . . . 220D containing data for one of the applications 210A, 210B, 210C and 210D, communication client 230 may use the application tag to manage delivery of the data to the appropriate application. In the embodiment of FIG. 2, message dispatcher 328 retrieves messages from outbox 234 and forwards them through API 244 to the intended recipient application.

Message dispatcher 238 may be a component comprising computer-executable instructions that monitor messages in inbox 236 and forwards the data in a message to e-mail user interface 250 or one of the applications 210A . . . 210D, as appropriate, based on an application tag in the received message. Delivery may be achieved by message dispatcher 238 presenting the data through API 244 to a component of the recipient application.

As each message containing application data is received, message dispatcher 238 determines which of a plurality of applications 210A, 210B, 210C and 210D is to receive the data from the message. In the described embodiment, registry 240 is maintained by message dispatcher 238 to track which applications are available to receive data. As described above, an application tag identifying an application to receive data in a message may be appended to the data before transmission. An application tag may similarly identify messages as containing e-mail data, allowing message dispatcher 238 to likewise route e-mail data to e-mail user interface 250.

Registry 240 may contain information used by message dispatcher 238 to pass information to the recipient application based on the application tag. For example, each application may provide a function through which it receives data. The name or other identifier of this function may be stored in registry 240 in connection with the application tag. Message dispatcher 238 may read the application tag in a message in inbox 236 and identify an entry in registry 240 for that application tag. As part of the entry in registry 240, a function for the application may be provided. Message dispatcher 230 may remove the message from inbox 236 and call the function for the application as indicated in registry 240. For messages directed to e-mail user interface 250, the data from the message may similarly be supplied through a function in e-mail user interface 250 identified in registry 240.

As described above, data from messages in inbox 236 is pushed to a recipient application by message dispatcher 238. It is not necessary that data be pushed to the application. Each application could pull data. To implement a pull architecture, message dispatcher 238 may contain a "RECEIVE" function that may be called by applications 210, . . . 210D or e-mail user interface 250. Such a function could examine messages in inbox 236 to identify messages containing data for the application calling the RECEIVE function. Application tags could also be used to match messages in inbox 236 to the intended application, though any suitable means may be used.

Figure 3:
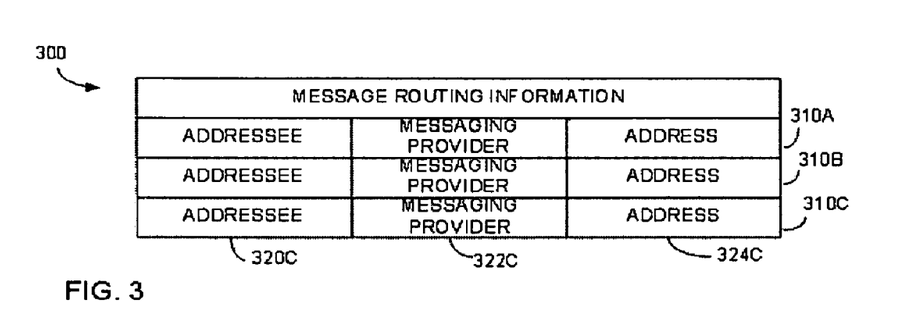
FIG. 3 is a sketch illustrating a data structure associated with software having the architecture of FIG. 2.

API 244 may also be programmed to contain other communication functions, such as functions that manage information stored in message routing information module 242. For example, API 244 may be programmed with functions that add or remove records in message routing information module 242. Such a function may be called by one of the applications 210A, . . . 210D that receives user input specifying a peer in peer-to-peer network 100 with which the application will exchange data. Conversely, an application may call a function within API 244 to remove a record from data structure 300 when communication is no longer desired with the peer reachable through the address specified in that record. Records in data structure 300 may be similarly added or removed by function calls made by e-mail user interface 250.

API 244 may include functions that may be called to edit information in any of the records in data structure 300. API 244 also may contain a function to allow an application to search for a specific record in data structure 300. Functions that add, remove, edit or search for records within a data structure are known. Accordingly, these functions within API 244 may be implemented using conventional programming techniques, whether now known or hereafter developed.

API 244 may provide other functionality for managing messaging client 230. For example, API 244 may provide a function that an application may call to register with message dispatcher 238. Such a function may place a record in registry 240 including an application tag for the application calling the registration function. The registration function may store, in addition to an application tag for the application, an entry point to the application that message dispatcher 238 may use to transmit data from messages directed to that application.

Turning to FIG. 3, additional details of message routing information module 242 are shown. Message routing information module 242 may be implemented as a data structure in any suitable form. FIG. 3 shows an example of a data structure that may be used. Data structure 300 may be stored in computer-readable memory associated with the peer on which messaging client 230 executes.

The example of FIG. 3 shows that data structure 300 includes multiple records, such as records 310A, 310B and 310C. Each record may contain multiple fields, of which fields 320C, 322C and 324C in record 310C are numbered.

Field 320C stores an addressee. The addressee may be stored as a text string, by a coded identifier or in any other suitable way. The addressee need not be an address as used by any of the messaging providers. For example, the addressee could be specified as a human user or as an application component.

Field 322C identifies a messaging provider over which messages may be sent to the addressee identified in field 320C. Any suitable method of representing a messaging provider may be used, such by storing the name of the messaging provider, a code associated with the messaging provider or a port through which the messaging provider is accessed.

Field 324C includes an address by which the addressee identified in field 320C may be accessed using the messaging provider identified in field 322C.

Data structure 300 may include multiple records having the same value in the addressee field, indicating that the same addressee may be accessed using multiple messaging providers. Alternatively, records in data structure 300 may have more fields than indicated, allowing multiple messaging providers to be specified for an addressee.

Figure 4:
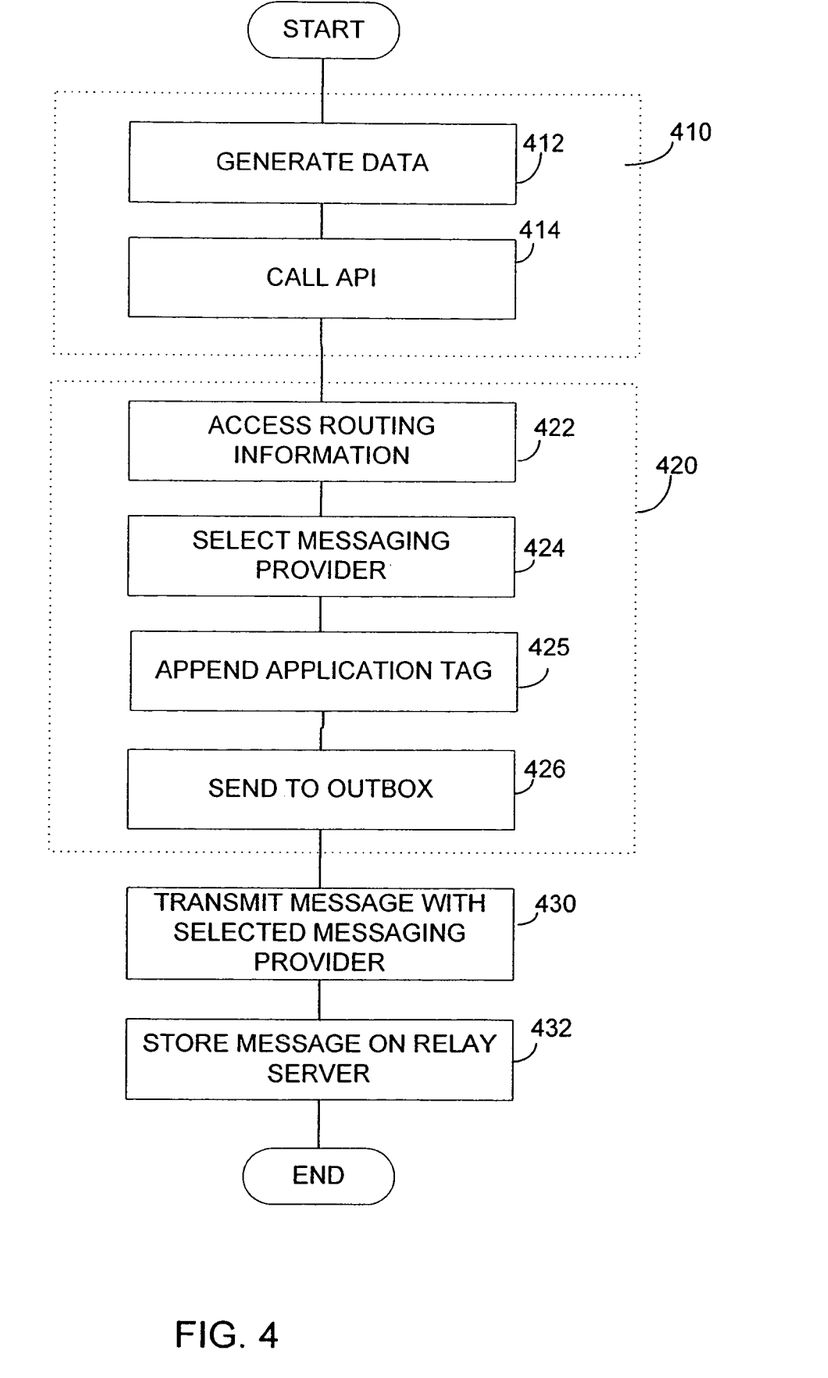
FIG. 4 is a flow chart of a process used by a peer to send a message.

Turning to FIG. 4, a process by which data may be transmitted as part of a peer-to-peer communication is shown. In this example, data is transmitted using a messaging provider operating a store-and-forward messaging system, but any suitable messaging provider may be used. The process of FIG. 4 includes a subprocess 410 performed within an application sending data. At block 412, the application generates the data to be sent. Block 412 may represent conventional processing by an application. For example, in a word processing application, the processor block 412 may involve obtaining user input, which may be obtained in any suitable way.

At block 414, the application begins the transmission process by making a call to a SEND function within API 244. The call to API 244 made at block 414 includes passing a parameter to the SEND function that identifies an addressee and data to be sent. In this example, the addressee information identifies another application component in a peer receiving the communication by specifying the application tag of the application to process that data on a remote peer.

Sub process 420 is then performed within messaging client 230. The call to the SEND function of API 244 made at block 414 results in an access to message routing information module 242. Routing information associated with the addressee specified in the call to API made at block 414 is retrieved from data structure 300. That information specifies a messaging provider and address recognized by that messaging provider associated with the peer intended to receive the data. The address of the peer does not need to be a network address of the peer and can be any address recognized by the messaging provider. For example, when a store-and-forward messaging provider is used, the message may be transmitted first to a relay server and the peer retrieving the message from the relay server may not be addressable over the network used to transmit the message.

At block 424, a messaging provider is selected. Where a single entry exists in data structure 300 for the addressee specified as a parameter to the SEND command called at block 414, the messaging provider specified in that record is selected at block 424. Where multiple records exist for such an addressee, processing at block 424 may involve performing an algorithm to select a preferred messaging provider. The messaging provider may be selected from the multiple messaging providers that may transmit a message based on transmission latency, amount of data to be communicated or other factors associated with each messaging provider and desired characteristics of the transmission.

At block 425, one or more application tags are appended to the data to be transmitted. Application tags may identify the application that generated the data to be transmitted and/or the application that is to receive the data.

At block 426, message aggregator 232 formats the data, the application tags and a destination address for the peer on which the application executes into a message. The message is in a form recognized by the messaging provider selected to transmit the message. Such a message may, for example, include a header containing the address of the peer to receive the message. The message, appropriately formatted for the selected messaging provider, is passed to outbox 234.

At block 430, the message in outbox 234 is transmitted by the selected messaging provider. In this example, the selected messaging provider is a store-and-forward messaging provider. Accordingly, the transmission of a message using that messaging provider results in the message being stored on a relay server at block 432.

The process of FIG. 4 also may be used for sending e-mail messages by e-mail user interface 250. When sending an e-mail, an application tag identifying the data as an e-mail message is appended at block 425.

Figure 5:
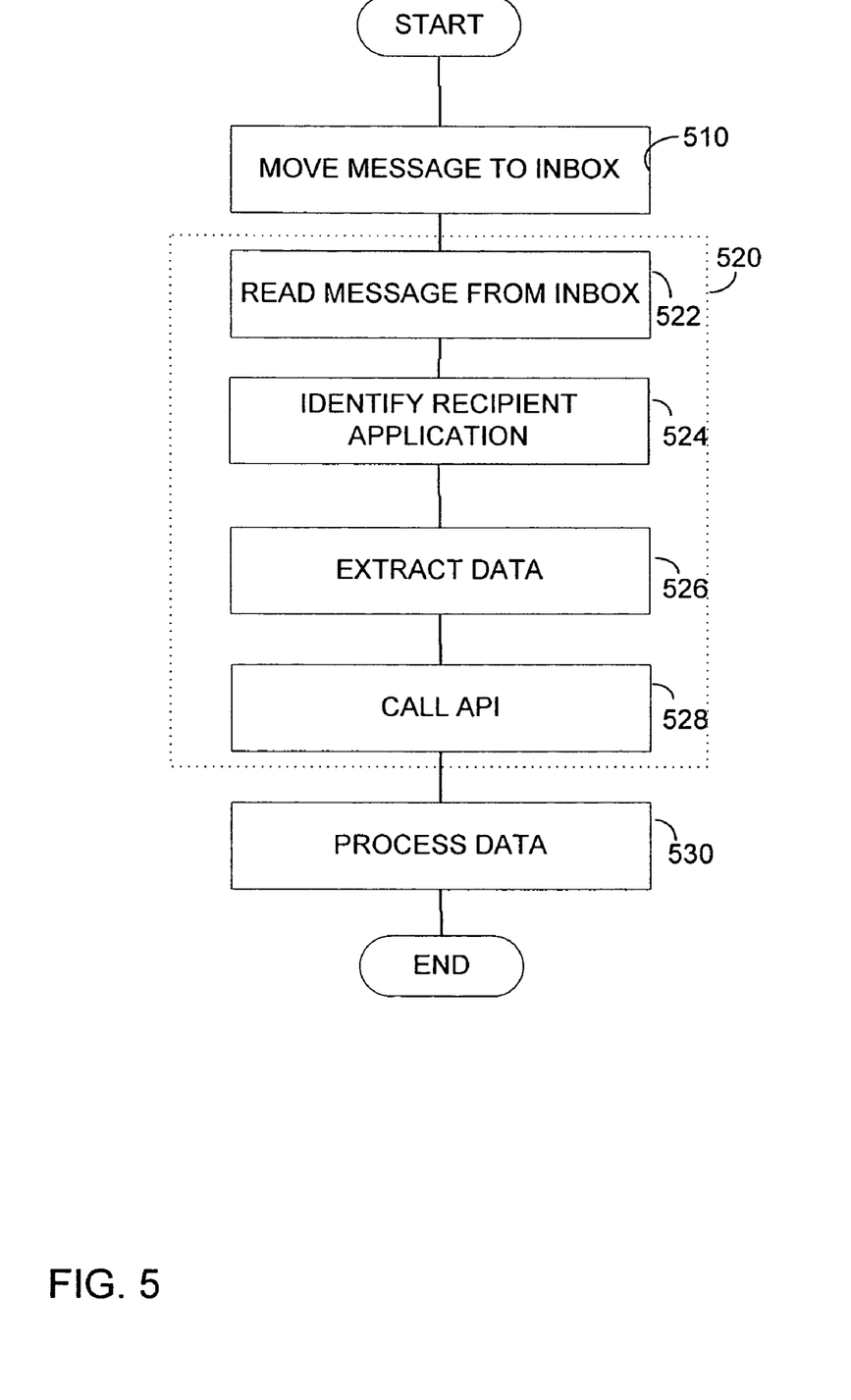
FIG. 5 is a flow chart of a process for receiving a message.

FIG. 5 illustrates a process by which data sent by one peer is received by an application on a remote peer and may be performed as a continuation of the process of FIG. 4. The process of FIG. 5 begins at block 510 where the message aggregator 232 of the messaging client 230 associated with that peer moves the message into inbox 236. In the example where the message is transported over a store-and-forward messaging provider, block 510 involves retrieving a message from a relay server and moving it to inbox 236. Other messaging providers may employ push type techniques that result in a message arriving in inbox 236 without message aggregator 232 initiating a transfer.

Next, subprocess 520 is performed. In this example, subprocess 520 is performed within message dispatcher 238 in the peer on which the application receiving the data executes. At block 522, a message is read from inbox 236. At block 524, message dispatcher 238 analyzes the data portion of that message to read the application tag that were appended to the data at block 424 (FIG. 4) as part of the transmission of the message. Message dispatcher 238 compares the application tag read from the received message to identification codes stored in its registry 240 to identify an application for which the data is intended.

At block 526, message dispatcher 238 may extract the data portion of the received message. This data is used in a call to a RECEIVE function within API 244 at block 528. The RECEIVE function called at block 528 accepts as a parameter the data extracted at block 526. The function may also accept as a parameter information read from registry 240 identifying an entry point or other method by which the identified application receives messages. The call to API 244 made at block 528 then transfers the data to the specified application using the specified entry point for the application.

Processing then continues to block 530. At block 530, the application receiving the data processes it in accordance with the application. The processing may be independent of the method by which the data was transmitted to the application.

Having thus described several aspects of at least one embodiment of this invention, it is to be appreciated that various alterations, modifications, and improvements will readily occur to those skilled in the art. For example, the invention is described in connection with peers that are single user devices, such as personal computers or smart phones. However, the invention is not so limited. A system as described above may be used for transmission from a device generally regarded as a server to a peer. In such an embodiment, the server may push-notify the peer device of a message.

As another example, software is described as being made of multiple modules. Each module may be a physically separate set of computer-executable instructions, such as may be stored in either source or executable code form in a separate and recognizable section of a computer-readable medium. However, modules may be combined or implemented as a portion of a larger program or components of a program and may have no separately identifiable structure. In this latter case, a "module" may be a functional portion of a larger component.

As an example of an additional variation, embodiments are described above in which messaging providers are used to transport messages from one peer to a remote peer. Messages may be communicated in any fashion. A single message may also be communicated using multiple providers. For example, a message may be transmitted using first an e-mail messaging provider that relays the message to a cellular telephone company for delivery to a remote peer. Accordingly, any number or combination of messaging providers or communications channels may be used as a messaging provider for messages.

Further, the communications functions that may be implemented by an API or a messaging client is not limited to the specific messages described above. For example, some component of the communication system could be programmed to poll addressees in the data structure 300 to find an addressee willing and/or able to engage in a peer-to-peer communication. Such a function could be useful for application components that implement multi-player games. Addressees could be polled to find an addressee willing to participate in the game. Even if such a function is not implemented as part of messaging client 230, an application could poll addresses by using functions that read entries in data structure 300 and send messages to the addressees.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-readable medium having computer-executable components for execution on a processor, the computer-executable components comprising:
   (a) a communication component for sending and receiving messages using at least one of a plurality of messaging providers, wherein each messaging provider operates at least a portion of a network infrastructure to provide a messaging service to one or more addressees;
   (b) a data store comprising a plurality of entries, each entry comprising a field for storing an indication of an addressee, a field for storing an indication of a messaging provider of the plurality of messaging providers, and an address associated with the addressee in the indicated messaging provider;
   (c) a routing component for associating an application with a message received using one of the plurality of messaging providers and providing the message to the associated application; and
   (d) a programming interface through which an application may specify a communication related command that causes an interaction between the communication component and the data store for performing a communication function relating to transmission of data, wherein the communication related command identifies an intended addressee, wherein the interaction between the communication component and the data store comprises retrieving from the data store routing information identifying at least one messaging provider and at least one address associated with the intended addressee in the at least one messaging provider, and wherein the identification of the intended addressee does not include an address used by any of the plurality of message providers.

2. The computer-readable medium of claim 1, wherein the programming interface is adapted to perform a communication function comprising making an entry in a registry.

3. The computer-readable medium of claim 1, wherein the programming interface is adapted to perform a communication function comprising altering an entry in the data store.

4. The computer-readable medium of claim 1, wherein the computer readable-medium is installed in a portable electronic device.

5. The computer-readable medium of claim 1, additionally comprising
   (e) a component for sending messages that poll addressees indicated by entries in the data store to identify an addressee willing to receive communications relating to a peer-to-peer application.

6. A method of communicating between a first application component on a first peer and a second application component on a second peer through at least one of a plurality of messaging providers, the method comprising the acts:
   (a) providing generated application data from the first application component to a first store-and-forward messaging client on the first peer, the generated application data including information identifying an intended addressee, wherein the information identifying the intended addressee does not include an address used by any of the plurality of message providers, the first store-and-forward messaging client comprising:
      a first communication component for transmitting or receiving data using at least one of the plurality of messaging providers, the first communication component having a first programming interface through which data may be provided for transmission using a messaging provider of the plurality of messaging providers, and through which information from a messaging provider of the plurality of messaging providers may be passed to the first application component; wherein the generated application data is provided through the first programming interface of the first store-and-forward messaging client; and
      a datastore comprising a plurality of entries, each entry comprising a field for storing an indication of an addressee a field for storm an indication of a messaging provider of the plurality of messaging providers, and an address associated with the addressee in the indicated messaging provider;
   (b) selecting with the first store-and-forward messaging client at least one messaging provider from the plurality of messaging providers based on an indication of a messaging provider in one or more entries in the datastore that have an indication of the intended addressee, wherein the at least one messaging provider operates at least a portion of a network infrastructure to provide a messaging service to the first store-and-forward messaging client; and
   (c) transmitting the generated application data to a second store-and-forward messaging client on the second peer using the selected at least one messaging provider and using an address associated with the addressee for the indicated messaging provider in an entry in the datastore that has an indication of the intended addressee; wherein the second store-and-forward messaging client on the second peer comprises a second communication component for transmitting or receiving data using at least one of the plurality of messaging providers, the second communication component having a second programming interface through which data may be provided for transmission using a messaging provider of the plurality of messaging providers and through which information from a messaging provider of the plurality of messaging providers may be passed to the second application component.

7. The method of claim 6, wherein the first application component and the second application component are components of a multiplayer game and the act (a) of providing generated application data comprises providing data representing a player action in the game.

8. The method of claim 6, wherein the act (c) of transmitting the generated application data comprises transmitting the generated application data from the first store-and-forward messaging client to a relay server and retrieving, by the second store-and-forward messaging client, the generated application data from the relay server.

9. The method of claim 6, wherein the act (b) of selecting comprises selecting a messaging provider operating according to a protocol in the set consisting of IMAP, POP3, SMTP, SMS, HTTP, TCP/IP and MMS.

10. The method of claim 6, further comprising:
(d) providing the generated application data from the second store-and-forward messaging client to the second application component.

11. The method of claim 6, wherein the first store-and-forward messaging client comprises an e-mail program and the method further comprises the acts:
(e) receiving user input with the first store-and-forward messaging client to send a text-based message; and
(f) sending the text-based message over one of the plurality of messaging providers.

12. The method of claim 10, wherein the act (d) comprises selectively routing at least one message received by the second store-and-forward messaging client to the second application component based on an identification that the data relates to the second application component.

13. A peer-to-peer communication system, comprising:
(a) a plurality of messaging providers, wherein each messaging provider operates at least a portion of a network infrastructure to provide a messaging service to one or more peers;
(b) a first peer coupled to at least a portion of the plurality of messaging providers and comprising a computer-readable medium having computer-executable components comprising:
(i) a first communication component for transmitting or receiving data using at least a portion of the plurality of messaging providers, the first communication component having a first programming interface through which data may be provided for transmission using a messaging provider of the plurality of messaging providers and through which information from a messaging provider of the plurality of messaging providers may be passed to an application;
(ii) a first application for generating and processing application data, the first application adapted to pass generated application data through the first programming interface and to receive application data for processing through the first programming interface, wherein the generated application data comprises information identifying an intended addressee, and wherein the information identifying an intended addressee does not include an address used by any of the plurality of message providers;
(c) a second peer coupled to at least a portion of the plurality of messaging providers and comprising a computer-readable medium having computer-executable components comprising:
(i) a second communication component for transmitting or receiving data using at least a portion of the plurality of messaging providers, the second communication component having a second programming interface through which data may be provided for transmission using a messaging provider of the plurality of messaging providers and through which data from a messaging provider of the plurality of messaging providers may be passed to an application;
(ii) a second application for generating and processing application data, the second application adapted to pass generated application data through the second programming interface and to receive application data for processing through the second programming interface.

14. The peer-to-peer communication system of claim 13, wherein first peer and the second peer are non-addressable computing devices in at least one of the plurality of messaging providers.

15. The peer-to-peer communication system of claim 13, wherein at least one of the plurality of messaging providers is a store-and-forward messaging provider.

16. The peer-to-peer communication system of claim 13, wherein at least one of the plurality of messaging providers is a realtime messaging provider.

17. The peer-to-peer communication system of claim 16, wherein the realtime transport messaging provider uses the SMS protocol.

18. The peer-to-peer communication system of claim 17, additionally comprising a web service connected to the at least one messaging provider using the SMS protocol, whereby said at least one messaging provider is coupled to the first peer and to the second peer through the web service.

19. The peer-to-peer communication system of claim 16, wherein the realtime messaging provider uses an IM protocol.

20. The computer-readable medium of claim 1, wherein the at least one messaging provider is a store-and-forward messaging provider, and wherein the routing information further comprises information that enables the transmission of data to a relay server associated with the store-and-forward messaging provider.

* * * * *